United States Patent
Osawa et al.

(10) Patent No.: US 12,487,486 B2
(45) Date of Patent: Dec. 2, 2025

(54) DISPLAY DEVICE

(71) Applicant: Japan Display Inc., Tokyo (JP)

(72) Inventors: Shuichi Osawa, Tokyo (JP);
Yoshikatsu Imazeki, Tokyo (JP);
Yoichi Kamijo, Tokyo (JP); Koichi Miyasaka, Tokyo (JP); Yoshifumi Kamei, Tokyo (JP)

(73) Assignee: JAPAN DISPLAY INC., Tokyo (JP)

( * ) Notice: Subject to any disclaimer, the term of this patent is extended or adjusted under 35 U.S.C. 154(b) by 0 days.

(21) Appl. No.: 18/191,877

(22) Filed: Mar. 29, 2023

(65) Prior Publication Data

US 2023/0314867 A1    Oct. 5, 2023

(30) Foreign Application Priority Data

Mar. 30, 2022 (JP) ................... 2022-056357

(51) Int. Cl.
*G02F 1/1335* (2006.01)
*G02F 1/1339* (2006.01)

(52) U.S. Cl.
CPC .. *G02F 1/133514* (2013.01); *G02F 1/133607* (2021.01); *G02F 1/1339* (2013.01)

(58) Field of Classification Search
CPC ......... G02F 1/133514; G02F 1/133607; G02F 1/1339; G02F 1/133388; G02F 2201/305; G02B 5/1866
See application file for complete search history.

(56) References Cited

U.S. PATENT DOCUMENTS

| | | | |
|---|---|---|---|
| 2015/0131041 A1* | 5/2015 | Moriwaki | G02F 1/1337 349/123 |
| 2018/0252964 A1* | 9/2018 | Nakaoka | G02F 1/133621 |
| 2020/0201114 A1* | 6/2020 | Tseng | G02F 1/1335 |

FOREIGN PATENT DOCUMENTS

| | | |
|---|---|---|
| JP | 2018-146750 A | 9/2018 |
| JP | 2020-158358 A | 10/2020 |

* cited by examiner

*Primary Examiner* — Angela M. Medich
(74) *Attorney, Agent, or Firm* — XSENSUS LLP

(57) ABSTRACT

According to one embodiment, a display device includes a liquid crystal panel and a color separation element substrate. The substrate includes a bonding area in a peripheral portion of a surface opposing the panel, and a color separation groove that serves as a color separation element is formed in an effective display area inside the bonding area. The panel includes a bonding area in a peripheral portion of the substrate on an incident surface side of the backlight, and a polarizer is disposed on an inner side the bonding area. The bonding area of the substrate and the bonding area of the panel are bonded to each other via a sealant layer formed from a sealant applied thereon and cured.

3 Claims, 7 Drawing Sheets

DISPLAY DEVICE

CROSS-REFERENCE TO RELATED APPLICATIONS

This application is based upon and claims the benefit of priority from Japanese Patent Application No. 2022-056357, filed Mar. 30, 2022, the entire contents of which are incorporated herein by reference.

FIELD

Embodiments described herein relate generally to a display device that uses technology of color separation element.

BACKGROUND

Display devices of a color filter (CF) type, used in liquid crystal display modules comprise a liquid crystal panel (a panel in which a CF substrate is stacked on a thin-film-transistor (TFT) substrate) in which CFs of RGB are formed in pixel units. In such devices, white backlight from a light source is made incident on the filters of the respective RGB pixels in accordance with the image to be displayed, thereby allowing light of wavelengths of the CF colors to pass through and absorbing light of wavelengths other than the CFs. Due to this configuration, light utilization efficiency is low. Under such circumstances, in order to enhance the light utilization efficiency, the technology of light separation element has been proposed.

The color separation element technology uses a color separation element with color separation grooves formed by a predetermined pattern of irregularities on the surface of a glass substrate, which diffract and separate the incoming white backlight in a specific direction for each respective RGB wavelength component. According to this technology, in a CF-type display device, a glass substrate on which the above-described color separation element is formed (which is to be referred to as "color separation element substrate" hereinafter) is placed between to the light source of the backlight and the TFT substrate so as to oppose thereto. Then, the backlight is separated by the color separation element into wavelengths corresponding to respective CFs of RGB and diffracted in specified directions to allow only light with wavelengths corresponding to CF to enter the filters of the respective RGB pixels via the TFT substrate. With this configuration, the absorption of light other than the wavelength corresponding to the CFs is reduced, thereby improving the utilization efficiency of light (luminance).

In this case, note here that a gap (Air-GAP) needs to be provided between the color separation element substrate and the TFT substrate to spatially separate the light diffracted for each color. Under these circumferences, such a method is being studied, which is carried out to bond an edge surface portion of the TFT substrate and a peripheral portion of the color separation element substrate using a double-sided tape shaped into a hollow square to create a gap by the thickness of the double-sided tape.

However, when bonding with double-sided tape, the TFT substrate may warp during reliability tests, which are carried out on an assumption of use under high-temperature conditions, causing the bonding position to shift from the initial position. The reason for this is as follows. That is, the polarizer attached to the TFT substrate shrinks during the test, and thus the TFT substrate is bent, which causes the double-sided tape to deform, resulting in position shift.

Consequently, reliability tests under high temperature environments are hindered, and it is difficult to respond to the narrowing of the frames in display devices.

DETAILED DESCRIPTION

Figure 1:
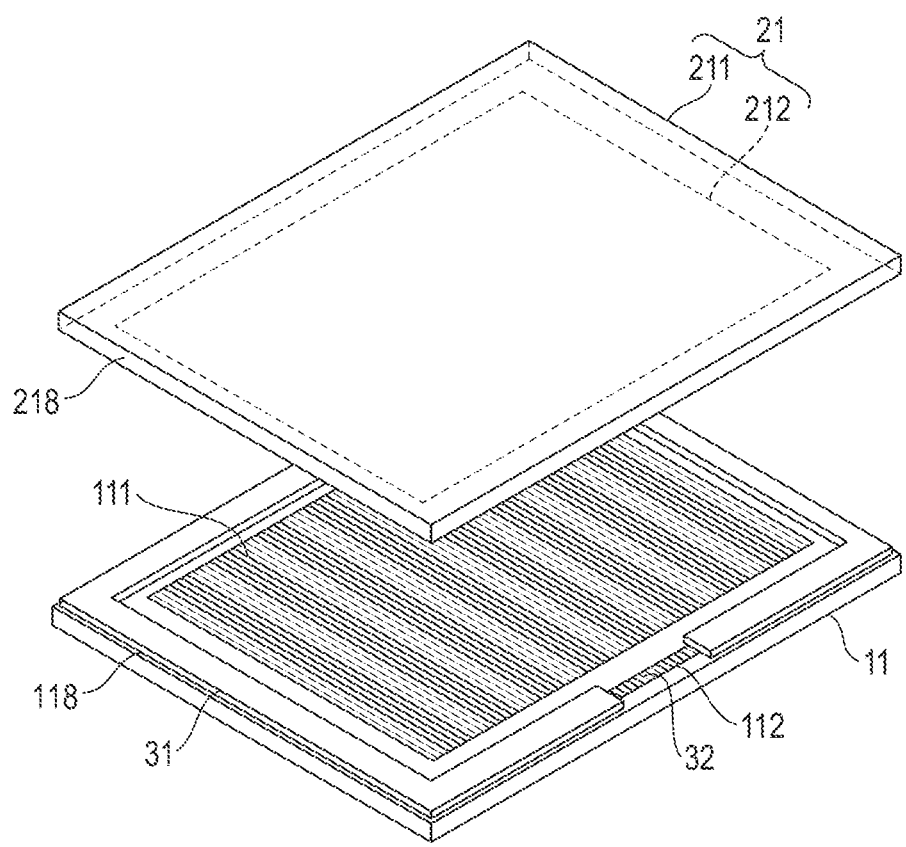
FIG. 1 is an exploded perspective view showing a basic configuration of a display device according to an embodiment.

In general, according to one embodiment, a display device comprises a liquid crystal panel that receives backlight from a light source and absorbs designated color components with a color filter in accordance with a displayed image and a color separation element substrate disposed between the liquid crystal panel and the light source, and formed from a transparent material substrate, on one surface of which, a color separation element is formed. The color separation element substrate includes a bonding area of a certain width in a peripheral portion of a surface opposing the liquid crystal panel, and a color separation groove that serves as a color separation element is formed in an effective display area inside the bonding area. The liquid crystal panel includes a bonding area of a constant width in a peripheral portion of the transparent material substrate on an incident surface side of the backlight, and a polarizer is disposed on an inner side the bonding area. The bonding area of the color separation element substrate and the bonding area of the liquid crystal panel are bonded to each other via a sealant layer formed from a sealant applied thereon and cured.

According to the above-described configuration, the bonding position of the color separation device substrate and the liquid crystal panel with respect to each other can be maintained in the initial position even after reliability tests on the assumption of use under a high temperature environment are conducted.

Various embodiments will be described hereinafter with reference to the accompanying drawings.

Note that the disclosure is merely an example, and proper changes within the spirit of the invention, which are easily conceivable by a skilled person, are included in the scope of the invention as a matter of course. In addition, in some cases, in order to make the description clearer, the widths, thicknesses, shapes, etc., of the respective parts are schematically illustrated in the drawings, compared to the actual modes. However, the schematic illustration is merely an example, and adds no restrictions to the interpretation of the invention. Besides, in the specification and drawings, the same or similar elements as or to those described in connection with preceding drawings or those exhibiting similar functions are denoted by like reference numerals, and a detailed description thereof is omitted unless otherwise necessary.

First, the color separation element applied to this embodiment will be described with reference to FIGS. 6, 7A and 7B.

Figure 6:
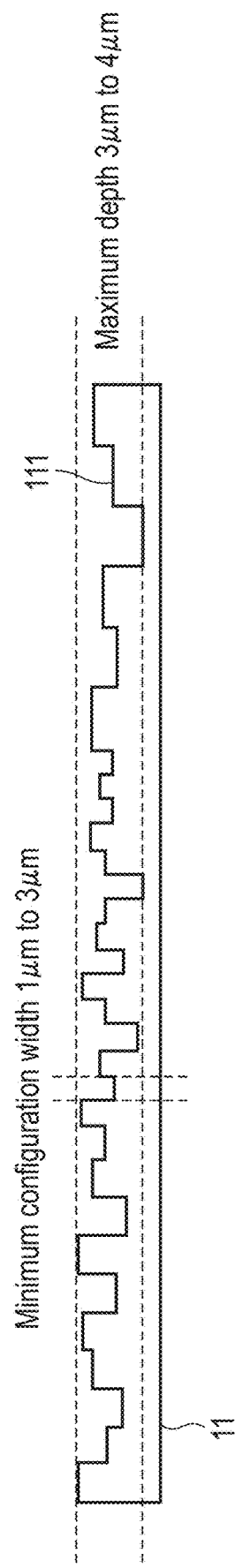
FIG. 6 is a cross-sectional view showing a specific structure of a color separation element applied in the embodiment.
Figures 7A, 7B:
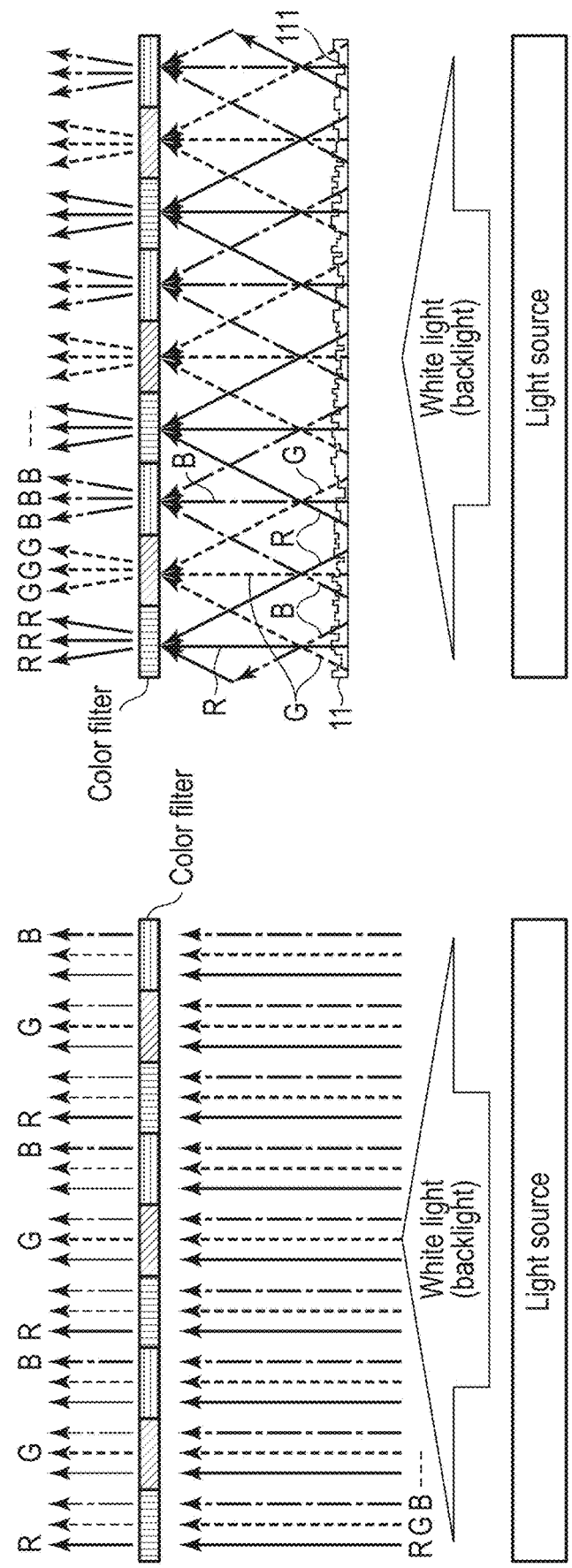
FIGS. 7A and 7B are cross-sectional views showing specific examples of color separation process of the color separation element shown in FIG. 6.

FIG. 6 is a cross-sectional view showing a specific structure of the color separation element, and FIGS. 7A and 7B are cross-sectional views showing specific examples of color separation process of the color separation element shown in FIG. 6.

That is, the color separation element is a glass substrate in which grooves with a minimum structural width of 1 μm to 3 μm and a maximum depth of 3 μm to 4 μm is formed in a predetermined pattern corresponding to RGB. Hereafter, the above-described grooves are referred to as color separation grooves 111. The glass substrate on which the color separation grooves 111 are formed is referred to as a color separation element substrate 11.

When backlight (white light) irradiated from a light source is made incident directly as it is on color filters, light other than R, G and B is absorbed by R, G and B filters, respectively, as shown in FIG. 7A. In contrast, when backlight (white light) is made incident on the color filters via the color separation element substrate 11, the R, G, and B components of the light are diffracted in different directions and focused on the respective color filters, as shown in FIG. 7B. In this manner, light absorption in the color filters can be reduced, thereby making it possible to improving the utilization efficiency of light (luminance).

An embodiment of a display device which employs the above-described color separation element substrate 11 will now be described.

Figure 2:
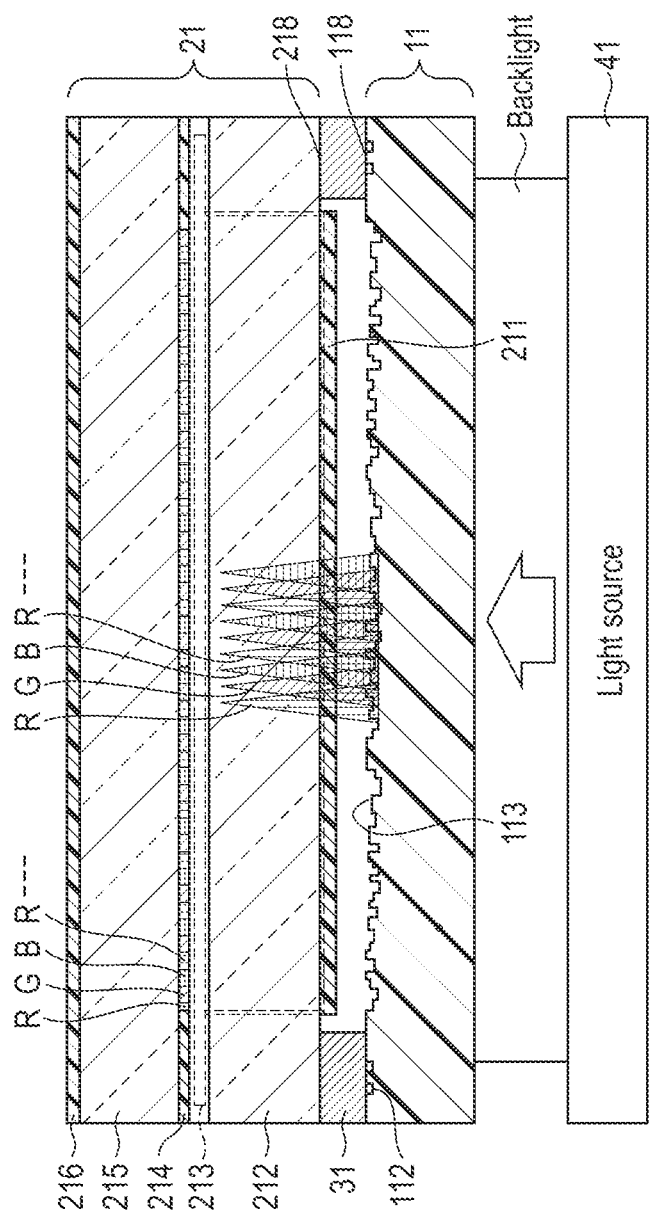
FIG. 2 is a cross-sectional view showing a stacked layer structure of the display device of the embodiment.
Figure 3:
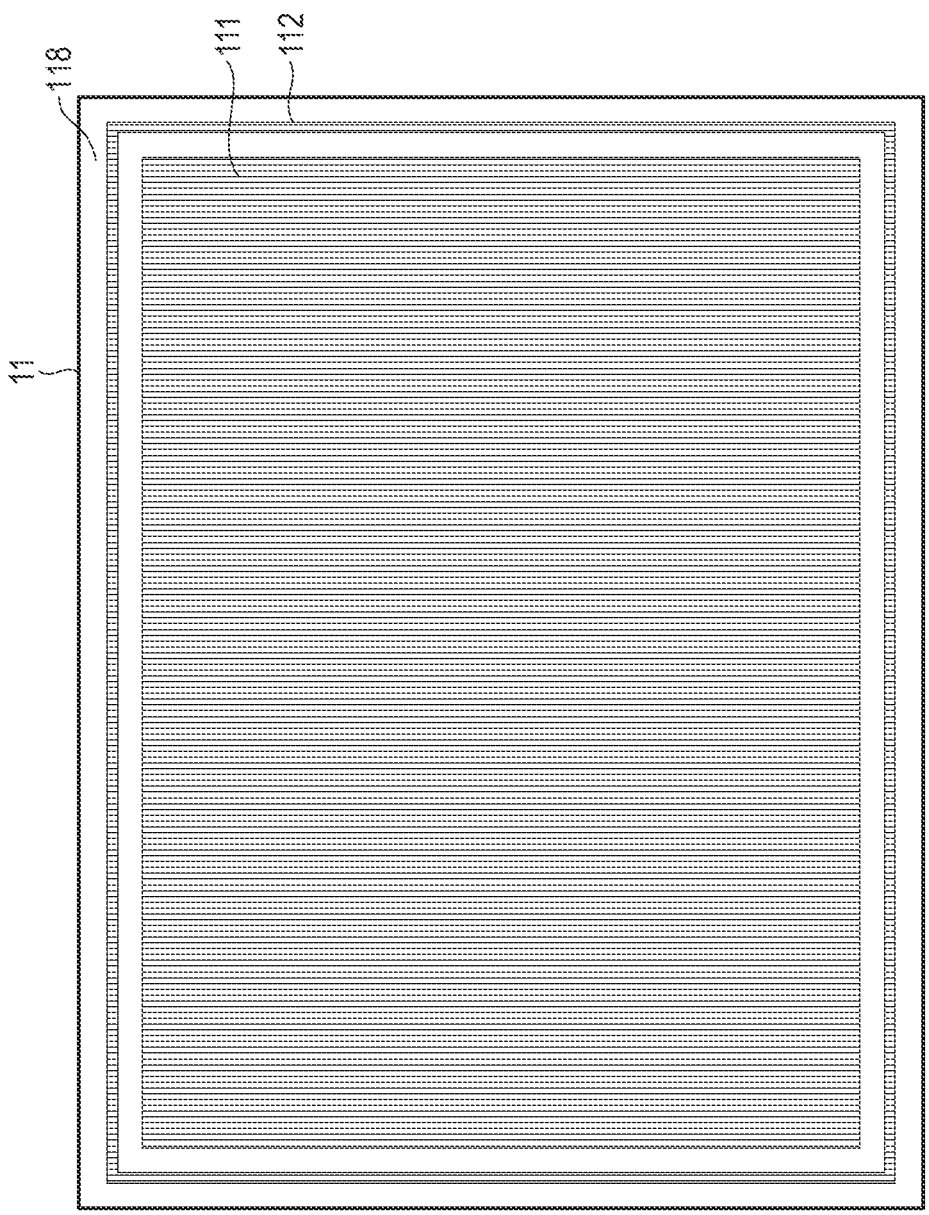
FIG. 3 is a front view showing a configuration of a color separation element substrate of the display device of the embodiment.
Figure 4:
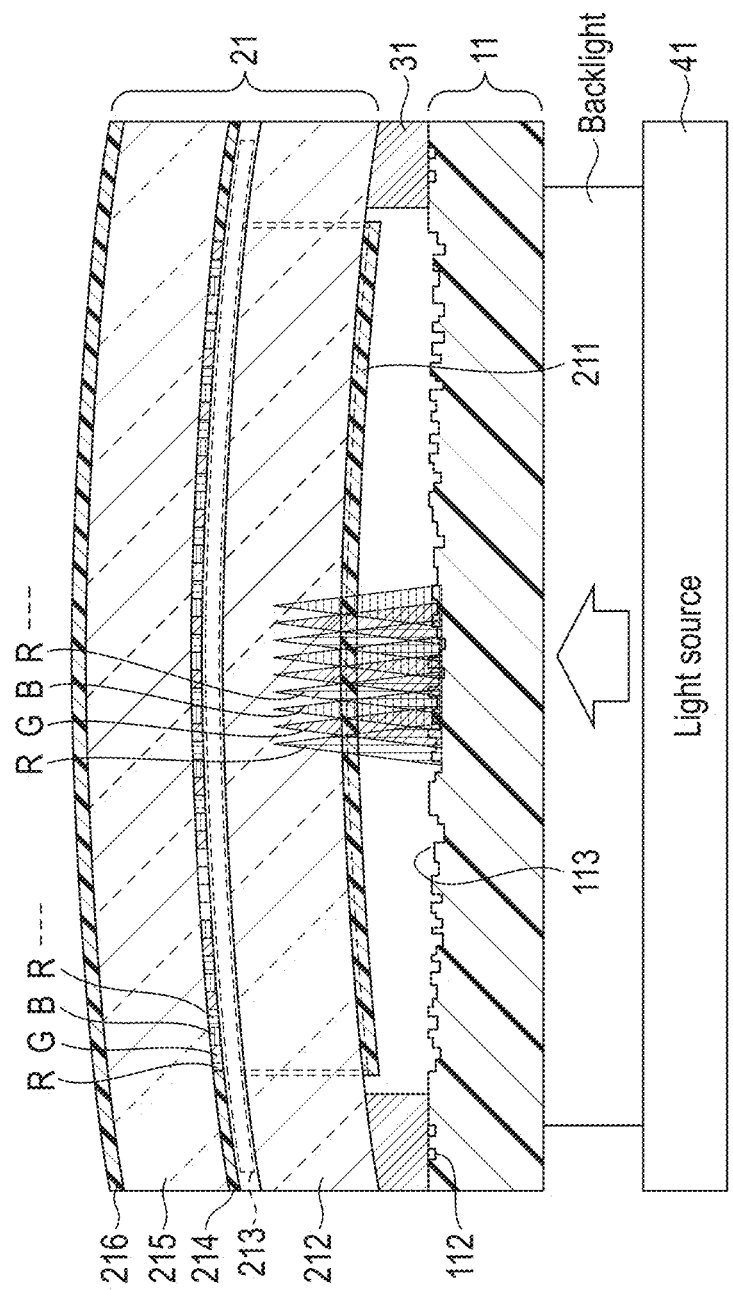
FIG. 4 is a cross-sectional view showing a warping state when a reliability test under a high temperature environment is carried out on the display device of the embodiment.

FIG. 1 is an exploded perspective view showing a basic configuration of the display device according to the first embodiment, FIG. 2 is a cross-sectional view showing a stacked layer structure of the display device according to the embodiment, and FIG. 3 is a front view showing a configuration of the color separation element substrate of the display device according to the embodiment. The display device shown in FIGS. 1 and 2 has a stacked layer structure in which the color separation element substrate 11 and a liquid crystal panel 21 are bonded together via a sealant layer 31.

First, in the color separation element substrate 11, a junction area of a certain width is secured I in a peripheral portion thereof, and the color separation grooves 111 are formed in the display effective area on an inner portion of an upper surface. Further, in a central portion of the junction area, color separation grooves 112 having a width less than that of the junction area are additionally formed perpendicular to the longitudinal direction, as shown in FIG. 3.

On the other hand, the liquid crystal panel 21 has a structure in which, in order from the incident side of the backlight irradiated from the light source 41, a lower polarizer 211, a TFT substrate 212, a liquid crystal layer 213, a CF layer 214, a CF glass substrate 215, and an upper polarizer 216 are stacked. The TFT substrate 212 includes a junction area of a certain width from a peripheral edge thereof on an incident surface side of the backlight. To the display effective area on an inner side the junction area, the lower polarizer 211 is attached.

Further, although a detailed explanation thereof will not be provided, pixel TFTs each provided for a plurality of pixels on the glass substrate are formed on the TFT substrate 212. The CF glass substrate 215 including the CF layer 214 is referred to as a CF substrate. The TFT substrate 212 and the CF substrate are bonded by a sealant layer, and the sealant layer seals the liquid crystal layer 213 between the TFT substrate 212 and the CF substrate.

To assemble the display device of the above-described configuration, a liquid sealant 31 containing a filler is applied to a bond region in the peripheral portion of the color separation element substrate 11 on the bonding surface of the substrate 11. The sealant 31 is applied in such a manner to draw a frame shape, for example, with a dispenser. After the sealant 31 is applied, it is bonded to the bonding area 218 of the peripheral portion of the TFT substrate 212 and fixed by heat curing or UV curing. Here, since the color separation grooves 112 are formed in the bonding area 118 of the color separation element substrate 11, the sealant 31 permeates to the grooves when the liquid sealant 31 is applied. Thus, it is possible to improve the adhesive strength. Here, the sealant 31 is a state before thermal or UV curing, and the sealant 31 after thermal or UV curing is referred to as the sealant layer 31.

In a portion of the above-described sealant layer 31, a notch portion, which is an air hole 32, is formed. The air hole 32 function as a measure to prevent condensation in the interior space, that is, preventing the interior from fogging (condensation) due to a temperature difference between the exterior of the display device and the portion between the color separation element substrate 11 and the lower polarizer 211.

The following is an explanation of the operational effects of the display device of the above-described configuration in comparison with the conventional case.

In the conventional double-sided tape adhesive structure, the color separation element substrate 11 and the TFT substrate 212 are bonded together with a double-sided tape. With this configuration, after the reliability test (creating a high temperature environment) is applied, the color separation element substrate 11 and the TFT substrate 212 are misaligned with respect to each other from the alignment, and an RGB display area different from that of the initial state appears. The reason for this is that the polarizer shrinks during the reliability test under high temperature environment and the liquid crystal panel warps, thereby deforming the double-sided tape and causing misalignment from the right position.

In contrast, when the sealant 31 is used as the bonding material and the sealant layer 31 is formed by carrying out thermal or ultraviolet curing, deforming does not easily occur unlike the case of the tape. In the embodiment, based on the fact that the adhesive material is deformed by the deflection of the liquid crystal panel due to the shrinkage of the polarizer, resulting in misalignment, the sealant adhesive structure is adopted to increase the rigidity of the adhesive material and to prevent deflection. With this structure, even after reliability tests which create high temperature environment were applied, no misalignment was observed. Further, it has been confirmed that when the sealant is brought into contact with the color separation grooves formed in the bonding area, it spreads by capillary action. Thus, the bonding area increases, thus making the adhesion stronger and making it difficult to displace from alignment.

Figure 5:
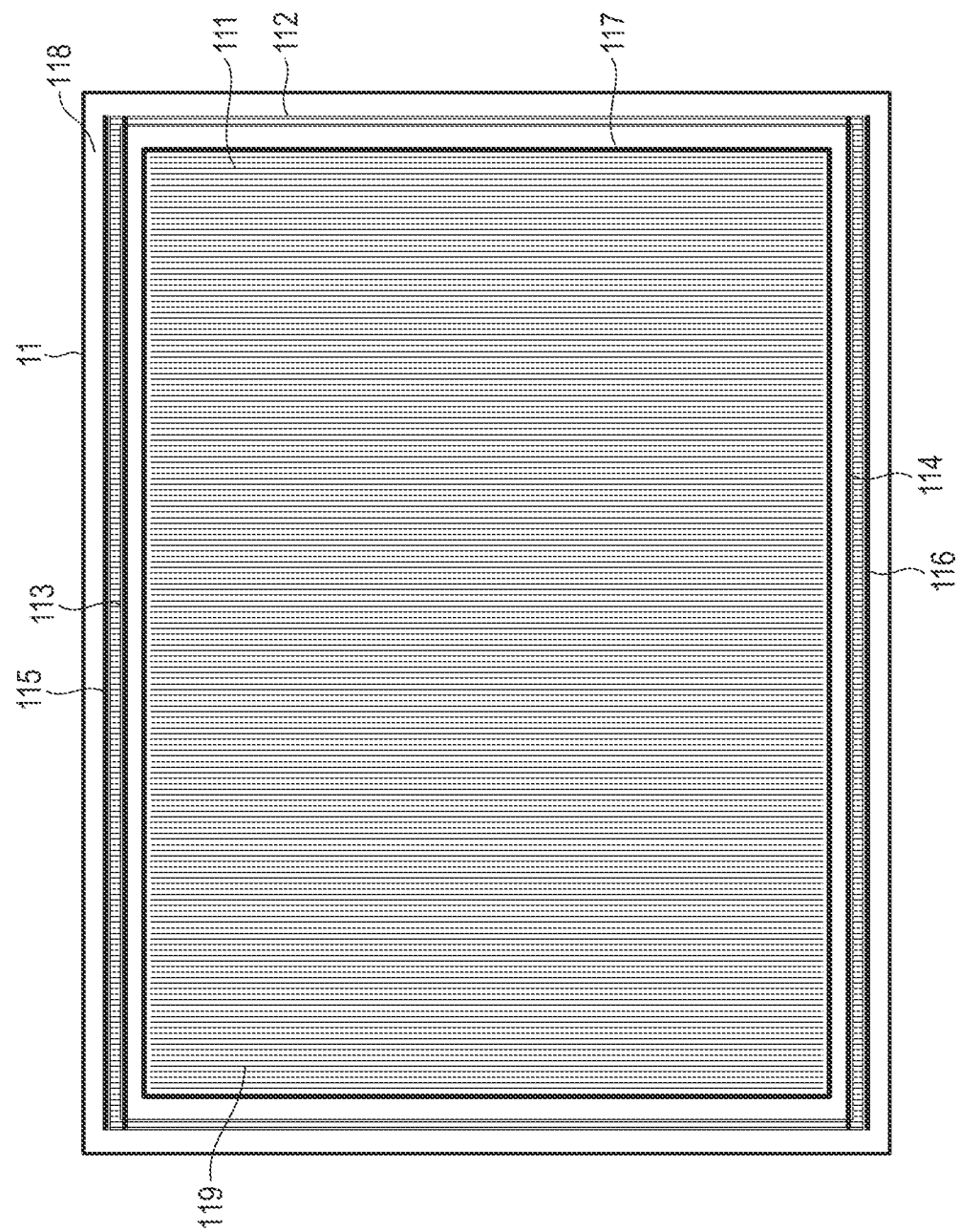
FIG. 5 is a front view showing another configuration of the color separation element substrate of the display device of the embodiment.

FIG. 5 is a front view of another configuration of the color separation element substrate of the display device according to the embodiment. In the above-described embodiment, the color separation grooves 112 are formed in the bonding area of the color separation element substrate 11. Here, further, it is preferable that, as shown in FIG. 5, inner grooves 113 and 114 and outer grooves 115 and 116 be formed on an inner side and an outer side of the color separation grooves 112, respectively, along the long side of the substrate 11. In other words, in the color separation element substrate 11, the color separation grooves 111 and 112 are formed along a direction perpendicular to the longitudinal direction, and two horizontal grooves are added to both the upper and lower longitudinal sides of the color separation groove 112 formed on the outer circumference. The grooves 113 to 116 should be wider and deeper than the color separation groove 112. With this configuration, overflow of the sealant can be supplied when applied. In particular, it is possible to suppress the overflow into the effective display and the deterioration of the color separation performance.

Furthermore, as shown in FIG. 5, a hollow-square-shaped groove 117 wider and deeper than the color separation grooves 112 may be provided between the grooves 113 to 116 and the color separation grooves 112 around the entire circumference of the effective display area 119. With this structure, it is possible to reliably prevent the entering of the sealant into the effective display area 119.

Note that in FIG. 5, the inner grooves 113 and 114, and the outer grooves 115 and 116 are formed, but only the inner grooves 113, 114 may as well do.

As described above, according to this embodiment, the color separation element substrate 11 and the liquid crystal panel 21 can be firmly integrated as one body with a uniform gap there between and without misalignment. In this embodiment, a separate member is used for bonding, and therefore the number of times of bonding operations increases; however with the use of a sealant, the risk of misalignment can be sufficiently reduced compared to the case of double-sided tape.

In the above-described embodiment, both the color separation element substrate and the TFT substrate are processed from glass materials, but transparent materials such as resin may as well be used.

Apart from the above, the present invention is not limited to the embodiments described above but the constituent elements of the invention can be modified in various manners without departing from the spirit and scope of the invention. Various aspects of the invention can also be extracted from any appropriate combination of a plurality of constituent elements disclosed in the embodiments. Some constituent elements may be deleted in all of the constituent elements disclosed in the embodiments. The constituent elements described in different embodiments may be combined arbitrarily.

What is claimed is:

1. A display device comprising:
a light source that emits backlight;
a liquid crystal panel substrate that includes an effective display area in which a plurality of pixels are arranged, the effective display area includes, in order from a back surface, a lower polarizing plate, a Thin Film Transistor (TFT) substrate, a liquid crystal layer, a Color Filter (CF) layer, and an upper polarizing plate are stacked, color filters of multiple colors are arranged in each of the plurality of pixels in the CF layer, the backlight is incident from the back surface and transmitted through the effective display area, each of the plurality of color filters receives the transmitted light of the liquid crystal layer, transmits the wavelength light of the filter color, and absorbs other wavelength light; and
a color separation element substrate that is arranged between the light source and the liquid crystal panel substrate, and includes a color separation groove having a predetermined uneven pattern in an effective display area of a same size as the liquid crystal panel substrate, the color separation groove diffracts and separates an incident light in a specific direction for each wavelength component corresponding to the CF layer, the plurality of color wavelength lights separated by the color separation groove are emitted to the effective display area on the back surface of the liquid crystal panel substrate, wherein
the entire periphery of the effective display area on the back surface of the liquid crystal panel substrate and the entire periphery of the effective display area on the surface of the color separation element substrate facing the back surface of the liquid crystal panel substrate are provided with a bonding area for aligning and bonding the effective display areas to each other,
the bonding area of the color separation element substrate has a groove,
the bonding area of the color separation element substrate and the bonding area of the liquid crystal panel are bonded via a sealing material layer, and
the sealing material layer containing a filler that is in contact with the groove of the bonding area of the color separation element substrate.

2. The display device according to claim 1, further comprising a third groove having a hollow rectangular shape in plan view, wherein
the third groove for preventing the sealant material from protruding is arranged surrounding the entire effective display area of the color separation element substrate.

3. A display device according to claim 1,
further comprising a notch formed in a part of the sealant layer, wherein the notch serves as an air hole.

* * * * *